(12) United States Patent
Takahashi et al.

(10) Patent No.: US 9,565,023 B2
(45) Date of Patent: Feb. 7, 2017

(54) SIGNATURE GENERATION AND VERIFICATION SYSTEM AND SIGNATURE VERIFICATION APPARATUS

(71) Applicant: HITACHI, LTD., Tokyo (JP)

(72) Inventors: Kenta Takahashi, Yokohama (JP); Masakatsu Nishigaki, Hamamatsu (JP); Yuta Yoneyama, Hamamatsu (JP); Eisei Honbu, Hamamatsu (JP)

(73) Assignee: Hitachi, Ltd., Tokyo (JP)

( * ) Notice: Subject to any disclaimer, the term of this patent is extended or adjusted under 35 U.S.C. 154(b) by 471 days.

(21) Appl. No.: 13/938,624

(22) Filed: Jul. 10, 2013

(65) Prior Publication Data

US 2014/0019766 A1    Jan. 16, 2014

(30) Foreign Application Priority Data

Jul. 11, 2012 (JP) .................................. 2012-155155

(51) Int. Cl.
*H04L 9/32* (2006.01)
*G06F 21/34* (2013.01)
*G06F 21/64* (2013.01)

(52) U.S. Cl.
CPC ............. *H04L 9/3281* (2013.01); *G06F 21/34* (2013.01); *G06F 21/64* (2013.01); *H04L 9/3231* (2013.01); *H04L 9/3247* (2013.01)

(58) Field of Classification Search
USPC ........ 713/176, 150, 163, 181; 726/2, 21, 36; 380/255, 264, 276
See application file for complete search history.

(56) References Cited

FOREIGN PATENT DOCUMENTS

JP          2003-323116 A     11/2003
WO        WO 02/50643 A1  *  12/2000  ............... G05F 1/00

OTHER PUBLICATIONS

Ting-Yi Chang: "Dynamically generate a long-lived private key based on password keystroke features and neural network", Information Sciences, Amsterdam, NL, vol. 211, Apr. 4, 2012, pp. 36-47.*

Carlisle Adams and Steve Lloyd, "Understanding PKI: Concepts, Standards, and Deployment Considerations," Pearson Education, Inc., translated into Japanese by Yuichi Suzuki, 2000.

(Continued)

*Primary Examiner* — Jason K. Gee
*Assistant Examiner* — Sharif E Ullah
(74) *Attorney, Agent, or Firm* — Mattingly & Malur, PC

(57) ABSTRACT

A signature generation and verification system including a signature generation apparatus and a signature verification apparatus is provided. Based on signer certification information possessed by a signer, the signature generation apparatus generates a digital signature and verification data corresponding to a given electronic document and outputs the set of the digital signature and the verification data as signature data. Upon receipt of the electronic document and the signature data, the signature verification apparatus verifies the digital signature using the verification data to verify the integrity of the electronic document. As needed, the signature verification apparatus performs user identification ex-post facto by authenticating that the signer certification information from which the verification data was generated belongs to a legitimate user without knowledge of the signer certification information.

4 Claims, 8 Drawing Sheets

(56) References Cited

OTHER PUBLICATIONS

Zimmermann, P. "The Official PGP User's Guide," Cambridge, MA: MIT Press, 1995 (second printing).
Adi Shamir, "Identity-Based Cryptosystems and Signature Schemes," Advances in Cryptology: Proceedings of CRYPTO 84, Lecture Notes in Computer Science, 7: 47--53, 1984).

* cited by examiner

FLOW OF SIGNATURE VERIFICATION
(SIGNER IDENTITY AUTHENTICATION) PROCESS

SIGNATURE GENERATION AND VERIFICATION SYSTEM AND SIGNATURE VERIFICATION APPARATUS

CLAIM OF PRIORITY

The present application claims priority from Japanese application JP 2012-155155 filed on Jul. 11, 2012, the content of which is hereby incorporated by reference into this application.

BACKGROUND OF THE INVENTION

The present invention relates to a digital signature system that generates and verifies a digital signature for the purpose of attesting to the integrity of an electronic document and certifying the person who prepared that document.

Digital signatures are used extensively for preventing the fabrication or falsification of electronic documents (attestation of integrity) and for personal authentication. With ordinary digital signature systems, the signer generates his or her own secret key paired with a public key in advance, and has the public key made public. Generally, the secret key is stored on an IC card or the like and managed personally by the signer so that the key may be used only by the signer and kept secret to other people. The signer can generate his or her signature on a given electronic document using the secret key. The verifier can verify the signature paired with the electronic document (both not fabricated or falsified) using the public key. For example, the algorithms for such digital signatures include RSA signature, DSA, ElGamal signature, Schnorr signature, elliptic curve DSA, elliptic curve ElGamal signature, and elliptic curve Schnorr signature.

With the digital signature system, however, if the owner of the public key is falsely impersonated, the validity of the signature is lost. For example, suppose that a document prepared and signed by signer A is falsified by wrongdoer B, that the signature of signer A is replaced with that of wrongdoer B, and that the public key of wrongdoer B is made public falsely as the public key of signer A. In such a case, the verifier of signature will accept the document falsified by wrongdoer B as a valid document prepared by signer A.

In order to circumvent the above problem, PKI (Public Key Infrastructure) has been utilized (see Non Patent Literature 1). With PKI, a set of a public key and data such as the ID of the public key owner is provided with a signature by a trustworthy third party (certification authority). This signature is given as a certificate. The verifier first verifies the signature of the certification authority included in the signer's certificate, and verifies the signature of the electronic document of interest using the public key included in the certificate. In order to further ensure the validity of the public key from the certification authority, a signature of a higher-order certification authority is attached to the signature of the certification authority. In this manner, PKI predicates overall trustworthiness on the assumption that, with dependencies of trust generally formed in a tree structure, all signers place their confidence in the certificates of the highest-order certification authority. (Non Patent Literature 1: Carlisle Adams and Steve Lloyd, "Understanding Public-key Infrastructure: Concepts, Standards, and Deployment Considerations," Published by Macmillan Technical Publishing 1999)

Also, PGP (Pretty Good Privacy) is used as software and a standard primarily for encrypting and signing e-mails (see Non Patent Literature 2). PGP adopts the concept "Web-of-trust," to be discussed below, as a solution different from that of PKI to the above problem. Using his or her secret key, a PGP user may attach his or her signature to the public key of any other user. For example, user A may identify user B using some appropriate method and attach his or her signature to user B's public key. User C is assumed to identify user A using some suitable method and thus trust the public key of this user. Suppose now that user B sends user C an e-mail signed with user B's secret key along with user B's public key signed with user A's secret key. Even though user C does not know (trust) user B, user C trusts user A's public key, so that user B's signed public key may be verified using user A's public key, whereby the validity of user B's public key and that of the e-mail verified using that public key are ascertained. This is the concept of "Web-of-trust," which means that the public key signed by a trustworthy user can be trusted. (Non Patent Literature 2: Zimmermann, P. "The Official PGP User's Guide," Cambridge, Mass.: MIT Press, 1997 (fourth printing).)

Also proposed has been a digital signature method (ID-based signature) whereby the user ID (e.g., user's mail address) itself is used as a public key (see Non Patent Literature 3). With the ID-based signature scheme, the user ID serves as the public key of each user. For this reason, there is no need to issue a certificate for the public key. However, the signer needs to have a trustworthy third party, called the Private Key Generator (PKG), generate and issue a secret key corresponding to the user ID. At this point, the PKG using some suitable method needs to verify that the person applying for a secret key is indeed the person in possession of the user ID in question. (Non Patent Literature 3: Adi Shamir, "Identity-Based Cryptosystems and Signature Schemes," Advances in Cryptology: Proceedings of CRYPTO 84, Lecture Notes in Computer Science, Vol. 196, 1985, pp. 47-53).

JP-2003-323116-A (Patent Literature 1) discloses a method aimed at simplifying the identification procedure for allowing a user to register a public key with PKI. The disclosed method involves carrying out the following process for generating a secret key (SK) for public key encryption using biometric data B and secrete data R and for identifying the user in question upon receipt of a public key certificate issued by the certification authority: With regard to the secret key SK for RSA public key encryption generated using the secret data R and first biometric data B of the user, second biometric data B' of the user is obtained. And using the second biometric data B', it is verified whether the secret key SK has been generated from the secret data R and the first biometric data B.

SUMMARY OF THE INVENTION

PKI is challenged with the problems about convenience and cost, as will be described below. When using PKI, the signer needs to prove his or her identity in advance to the certification authority and be examined thereby. The examinations may require, for example, the signer to present his or her ID at the counter of the authority, mail the ID thereto for verification, or have his or her identity verified by telephone with the authority's staff. This involves raising the running cost of the certification authority; the issuance of a certificate generally entails paying a fee. Furthermore, PKI constitutes a complex model that has the certification authority authenticated by a high-order certification authority which in turn is validated by a higher-order certification authority. That means the cost of making up the entire system can be inordinately high.

As with PKI, the ID-based signature scheme is also challenged with the problems about convenience and cost. That is because the signer also needs to prove his or her identity to the PKG beforehand and undergo examinations thereby.

Meanwhile, PGP is challenged with the problem about trustworthiness. For PGP, there is no TTP (Trusted Third Party) that may be run securely with not much cost like the certification authority of PKI. The general users sign other people's public keys and, based on the concept of "Web-of-trust," extend dependencies of trust in order to provide the basis for the reliability of the system as a whole. However, upon signing another user's public key, each user may or may not strictly verify the other user's identity. Thus there exists the danger that a legitimate user may unknowingly sign the public key of a user falsely impersonating another user, and there is a possibility that a group of malicious users may mutually sign each other's (falsely impersonated) public keys. Such vulnerability can considerably lower the trustworthiness of the entire system.

The method described in the above-cited Patent Literature 1 involves having public keys registered beforehand with the certification authority of PKI so that the signer may be identified without face-to-face communication when a public key certificate is to be issued. As such, the method is effective in slightly improving the convenience for the users. Still, it is necessary to have the public key certificate issued beforehand by the certification authority. Thus the problems about convenience and running cost remain unsolved.

Meanwhile, digital signatures are primarily aimed at electronically implementing the function of signatures (by hand) and seals in the real world. As such, digital signatures correspond to the certificate of registered seal or the certificate of registered signature in the real world. However, in the real world, the signatures or seals on documents are considered effective (legally or in light of common sense) without the signatures or seals being duly registered beforehand. That is because the signatures and seals can be subsequently identified to a certain extent by signature verification, handwriting analysis, or seal verification. Thus in the real world, a methodology is adopted whereby the attestation of a person having intentionally worked on a document (preparation, approval, etc.) is predicated on the physical evidence (signature, etc.) that can later be identified using suitable methods. However, this methodology has yet to be implemented electronically. That is because the secret key and public key used in digital signatures are not inseparably associated with the person in question, so that that person needs to be certifiably linked with the public key or secret key through suitable prior identification.

The present invention has been made in view of the above circumstances and provides a highly trustworthy digital signature system which solves the problems about convenience and cost by eliminating the need for prior identification as is customary with signatures and seals in the real world and which can perform reliable identification ex-post facto as needed.

In carrying out the present invention and according to one embodiment thereof, there is provided a signature generation and verification system including a signature verification apparatus and a user certification apparatus. The signature verification apparatus includes: a signed electronic document input section which acquires electronic document data generated by a signature generation apparatus, and signature data made of a set of a digital signature and verification data; an integrity verification section which verifies the integrity of the set of the electronic document data and the electronic signature using the verification data; an identification section which transmits to the user certification apparatus authentication data for authenticating that the verification data was generated based on predetermined user certification information unique to a user and which identifies the user based on the digital signature transmitted from the signature generation apparatus; and an output section which provides either "accept" or "reject" output based on either or both of the result of integrity verification by the integrity verification section and the result of identification by the identification section. The user certification apparatus includes: a user certification information input section which receives the input of the user certification information; and a digital signature generation section which generates the digital signature based on the authentication data received from the signature verification apparatus and transmits the digital signature to the signature verification apparatus.

According to this invention, the signer is allowed to give his or her signature to a given electronic document with no need for prior identification or key registration. The verifier is allowed to verify the integrity of the electronic document in question and, as needed, verify ex-post facto the identity of the signer or ascertain ex-post facto that the same person has generated signatures to a plurality of electronic documents.

BRIEF DESCRIPTION OF THE DRAWINGS

Further objects and advantages of the present invention will become apparent upon a reading of the following description and appended drawings in which.

DETAILED DESCRIPTION OF THE INVENTION

[First Embodiment]

A first embodiment of the present invention is explained below in reference to the accompanying drawings.

For example, the first embodiment is a digital signature generation and verification system which allows the signer to given his or her signature to a given electronic document with no need for prior identification or key registration, which allows the verifier to verify the integrity of the electronic document in question and which, as needed, verifies ex-post facto the identity of the signer or ascertains ex-post facto that the same person has generated signatures to a plurality of electronic documents (signer identity verification). The system of this embodiment may be used, for example, to certify the person who prepared an e-mail or a Web page, sign electronic contract documents, give approvals in a work flow, and certify the products of office work or the workers keeping their work logs.

Figure 1:
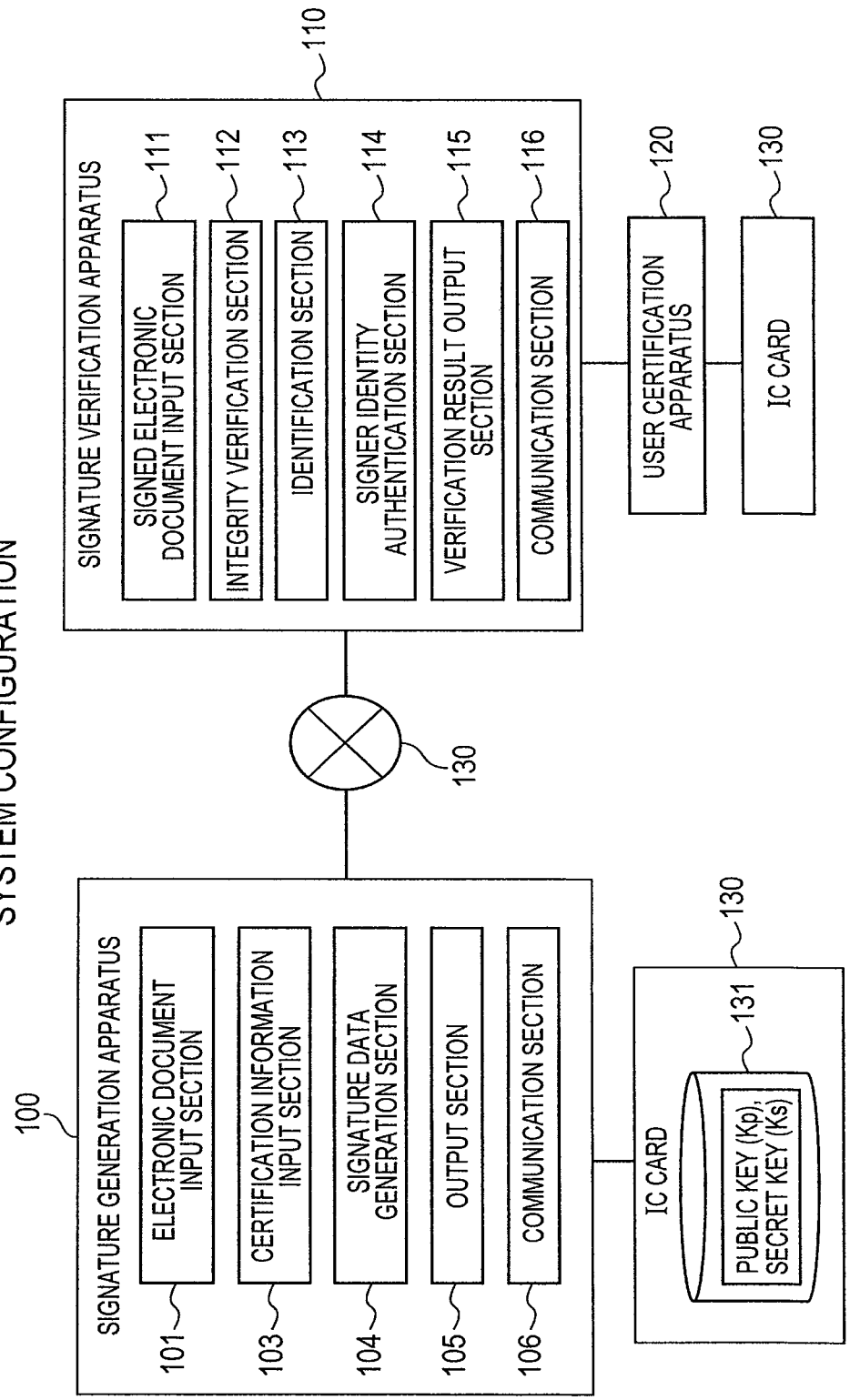
FIG. 1 is a block diagram showing a system configuration of one embodiment of this invention.

FIG. 1 shows a system configuration of the signature generation and verification system as the first embodiment.

This system is made up of a signature generation apparatus 100 that generates a signature corresponding to an electronic document, a signature verification apparatus 110 which verifies the integrity of the electronic document in question using the signature and which identifies as needed the user (signer) having generated the signature, a user certification apparatus 120 used by the signer upon identity verification, and an IC card 130 possessed by the signer.

The signature generation apparatus 100 is composed of an electronic document input section 101 that receives the input of an electronic document, a certification information input section 103 that receives the input of certification information (to be discussed later in detail) on the signer, a signature data generation section 104 that generates the signature of the signer corresponding to the electronic document, an output section 105 that outputs the electronic document and signature data, and a communication section 106 that performs communication via a network 140. The output section 105 may output the electronic document and signature data to recording media such as a USB memory, output the document and data onto physical media such as paper in the form of characters or barcodes on a printer or the like, or transmit the document and data to the signature verification apparatus 110 or to a storage server or the like via the communication section 106 and network 140.

The signature verification apparatus 110 is made up of a signed electronic document input section 111 that receives the input of a signed electronic document via recording media such as a USB memory, via physical media such as paper or by way of a network, an integrity verification section 112 that verifies the integrity of the electronic document (not to be falsified), an identification section 113 that identifies the signer as needed, a signer identity authentication section 114 that authenticates as needed the same signer having signed a plurality of electronic documents, a verification result output section 115, and a communication section 116.

The user certification apparatus 120 has substantially the same structure as the signature generation apparatus 100, and communicates with the signature verification apparatus 110.

The certification information is information possessed only by each signer and is different from one signer to another. With this embodiment, it is assumed that each signer is issued with the IC card 130 and that the IC card 130 records beforehand a pair of a public key and a secret key (Kp,Ks) 131 randomly generated for each card using a key generation function (Gen).

Figure 9:
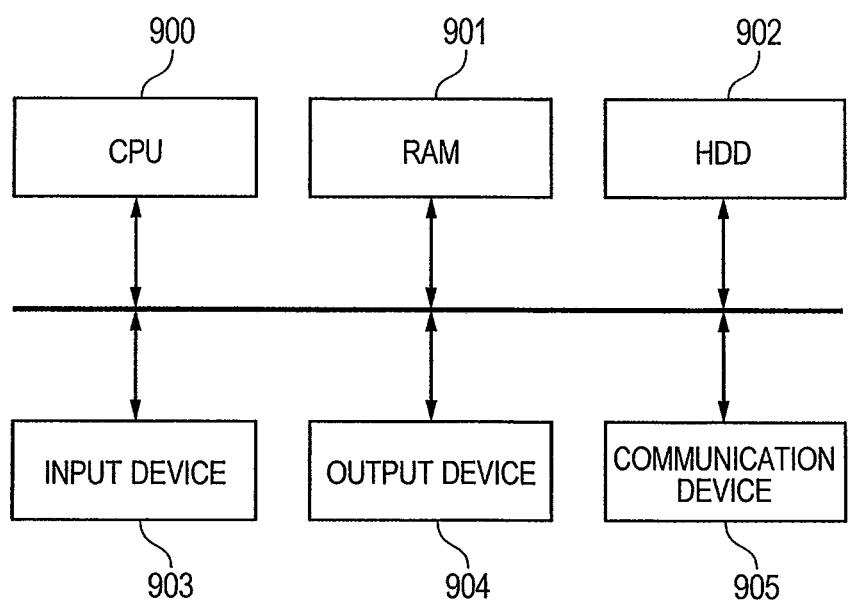
FIG. 9 is a block diagram showing a hardware configuration including a signature generation apparatus, a signature verification apparatus, and a user certification apparatus also embodying this invention.

FIG. 9 shows a hardware configuration of the signature generation apparatus 100, signature verification apparatus 110, and user certification apparatus 120 constituting this embodiment. As illustrated, these apparatuses may be formed by a CPU 900, a RAM 901, an HDD 902, an input device 903, an output device 904, and a communication device 905.

Figure 2:
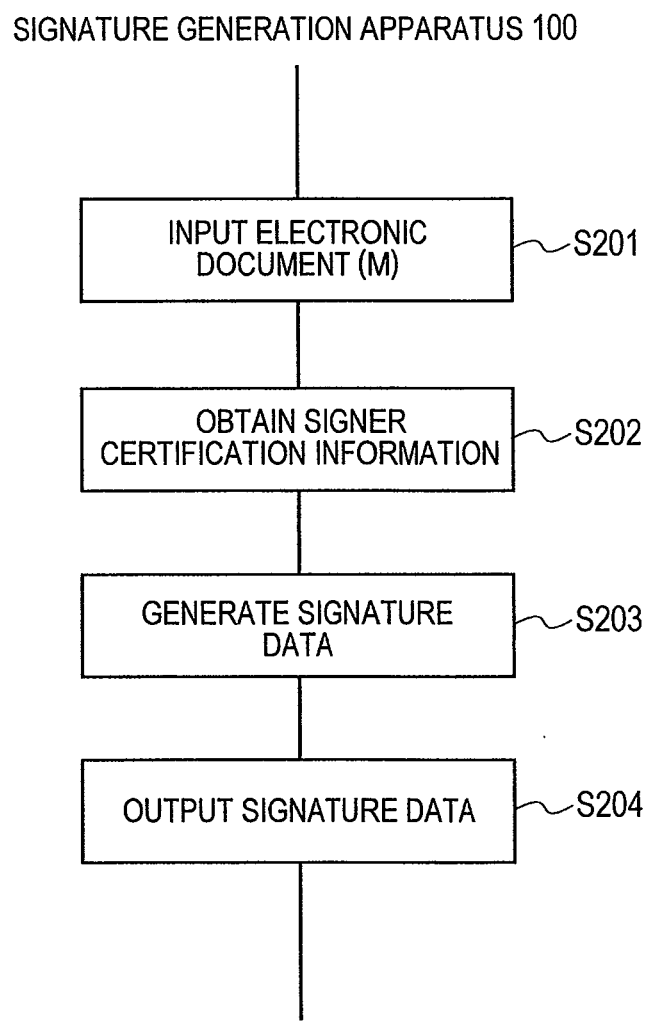
FIG. 2 is a flowchart showing a signature generation process performed by the embodiment.

Next, a flow of the signature generation process performed by this embodiment is explained in reference to FIG. 2.

The signature generation apparatus 100 acquires an electronic document M through the electronic document input section 101 (step S201). For example, the electronic document may be received via a network or read from recording media such as a USB memory. As another example, an electronic document prepared by the signature generation apparatus 100 may be read.

The certification information input section 103 reads the pair of the public key and secret key (Kp,Ks) 131 from the IC card 130 (step S202).

The signature data generation section 104 generates a digital signature σ=Sign(M,Ks) corresponding to the electronic document M using the secret key, and pairs it with the public key (S=(σ,Kp)) to form signature data (step S203). For a signature generation function (Sign), a signature verification function (Verify) to be discussed later, and the above-mentioned key generation function (Gen), a suitable digital signature algorithm such as RSA signature or DSA may be adopted.

A signature data output section outputs the above-mentioned signature data S=(σ,Kp) (step S204).

Figure 3:
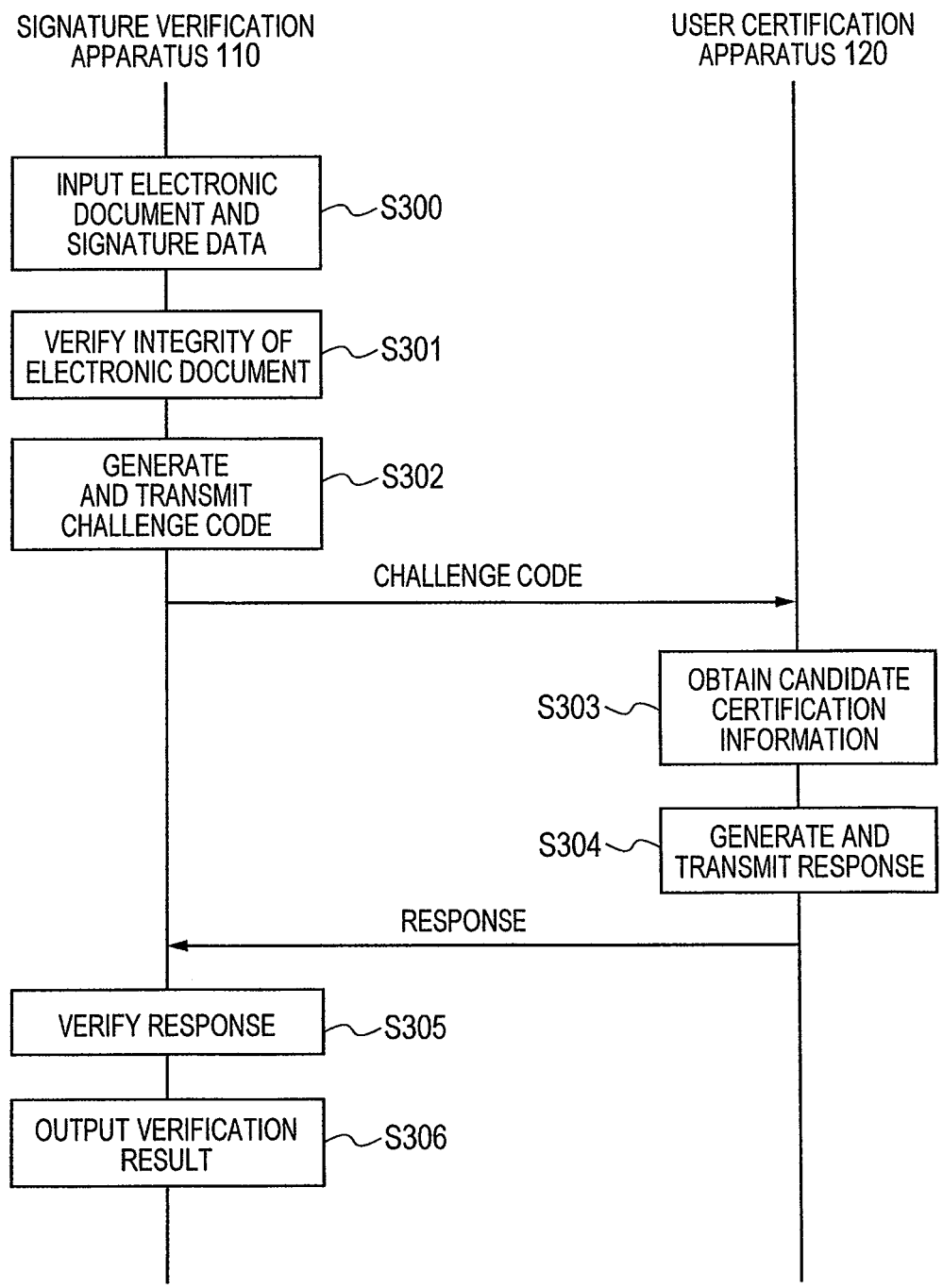
FIG. 3 is a flowchart showing a signature verification and signer authentication process performed by the embodiment.

Explained below in reference to FIG. 3 is a flow of the process of verifying the integrity of the electronic document M using the signature data S and of the process of identifying the signer who prepared the signature.

The signature verification apparatus 110 acquires the electronic document M and the signature data S=(σ,Kp) through the signed electronic document input section 111 (step S300). The electronic document M and the signature data S may be received via the network or retrieved from recording media such as a USB memory, for example.

The integrity verification section 112 verifies the set of the electronic document M and digital signature σ included in the signature data S, using the public key Kp included in the signature data S, so as to obtain a verification result v=Verify (M,σ,Kp) (v="success" or "failure")(step S301).

If it is desired solely to verify that the electronic document is not falsified, the signature verification apparatus 110 may output the verification result v and terminate the process.

For example, consider the case in which upon entering into a contract, the parties concerned are to attach their signature data to electronic contract documents. In making the contract, the parties concerned exchange therebetween the electronic contract documents furnished with their signature data. The contract is considered concluded when the exchanged electronic documents are successfully verified for integrity by each of the parties concerned. In the event of non-fulfillment of the contract, for example, the parties concerned with the contract may have to be identified by the court of law or like institutions. In this case, the process is finished in step S301 for the contract to be concluded. In case of disputes such as non-fulfillment of the contract, step S302 and the subsequent steps are carried out.

Alternatively, consider a system in which the participants in a given project are to attach their signature data to consecutively generated work logs for centralized management by a log server. With this system, solely the work logs may ordinarily be verified for integrity in periodical batch processing. Upon occurrence of an incident or other irregularities, the workers (i.e., signers) associated with the failure may be identified ex-post facto. In this case, the process is finished in step S301 at ordinary times. If the fact that an incident has occurred is obtained typically through change of settings by the system administrator, step S302 and the subsequent steps are carried out.

What follows is an explanation of the flow of the process in which the signers are identified ex-post facto. In the ensuing description, the person targeted for identify verification (i.e., the person likely to be the signer) will be called the candidate.

The identification section 113 generates random data (challenge code R) and transmits the generated data to the user certification apparatus 120 (step S302). The challenge code R may be generated using a pseudo-random number generator employing time information as the seed, for example.

The user certification apparatus 120 obtains the pair of the public key and secret key (KP',Ks') 131 from the certification information that was input beforehand from the candidate (step S303).

Given the challenge code R, the user certification apparatus 120 generates a digital signature σ'=Sign(R,Ks') using the secret key Ks, and transmits the generated digital signature as a response to the signature verification apparatus 110 (step S304).

The signature verification apparatus 110 receives the digital signature σ' as the response. Using the public key Kp, the identification section 113 verifies whether the digital signature σ' given as the response is the valid digital signature corresponding to the challenge code R, so as to obtain a verification result v'=Verify(R,σ',Kp) (step S305). It should be noted that verification result v' is "success" only if Ks=Ks'.

The verification result output section 115 gives "accept" output only if both the verification result v and the verification result v' are "success"; otherwise the verification result output section 115 gives "reject" output.

According to this embodiment, the signer can generate his or her signature data corresponding to an electronic document with no need for prior registration of a public key and a secret key involving authentication of the signer's identity. The verifier can verify the integrity of the electronic document by authenticating the signature data and identify the signer ex-post facto as needed. When the same public key Kp is used for the process of both integrity verification and signer identification, it is possible to ascertain that the identity of the person who generated the signature (person in possession of Ks) and the identify of the candidate (person in possession of Ks') are the same (on the assumption that the IC card of interest is always possessed by the same person).

Figure 4:
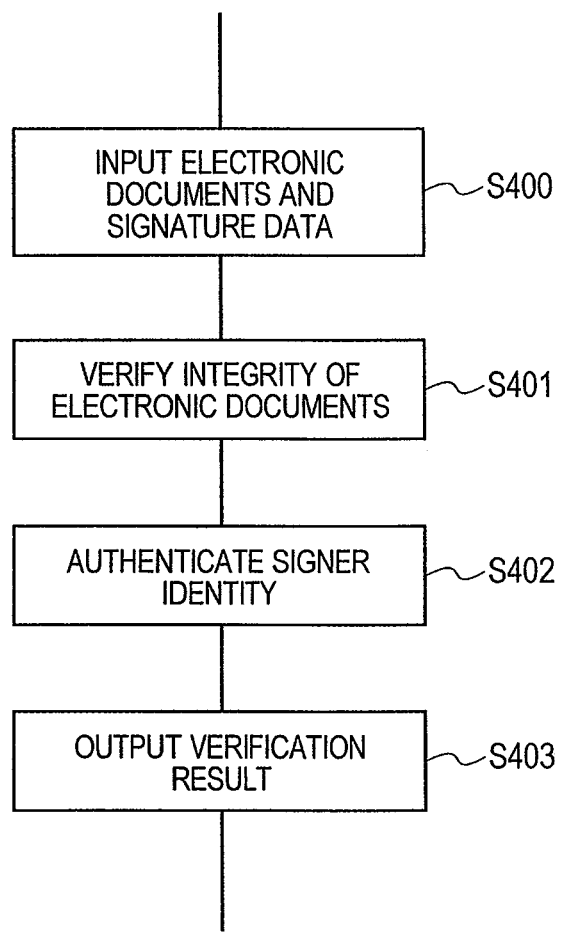
FIG. 4 is a flowchart showing a signature verification and signer identity authentication process performed by the embodiment.

Explained below in reference to FIG. 4 is the flow of the signer identity verification process which verifies the integrity of at least two electronic documents and which ascertains whether the same signer has generated the signature data corresponding to these electronic documents.

As an application that may require that process, consider a system in which the participants in a given project are to attach their signature data to consecutively generated work logs for centralized management by the log server. With this system, solely the work logs may ordinarily be verified for integrity in periodical batch processing. If there occurs a problem such as notably low quality of a given work portion, it may be necessary to verify whether the same person has signed two or more work logs in order to determine the other work portions that the worker in question has engaged in.

The signature verification apparatus 110 obtains two electronic documents M1 and M2 and two signature data S1=(σ1,Kp1) and S2=(σ2,Kp2) through the signed electronic document input section 111 (step S400).

The integrity verification section 112 verifies the set of the electronic document M1 and the digital signature σ1 included in the signature data S1, using the public key Kp1 included in the signature data S1 so as to obtain a verification result v1=Verify(M1,σ1,Kp1) (v1="success" or "failure"). In like manner, the integrity verification section 112 acquires a verification result v2=Verify(M2,σ2,Kp2) (step S401).

Then the signer identity authentication section 114 compares the public key Kp1 with the public key Kp2, and determines that the matching is "success" if the compared public keys are identical and that the matching is "failure" otherwise (step S402).

The verification result output section 115 gives "accept" output if the results v1 and v2 as well as the result of the determination in step S402 are all "success"; otherwise the verification result output section 115 gives "reject" output (step S403).

According to this embodiment, the signer can generate his or her signature data corresponding to electronic documents with no need for prior registration of a public key and a secret key involving authentication of the signer's identity. The verifier can verify the integrity of two electronic documents by authenticating the signature data and determine as needed whether the signatures of these documents have been given by the same signer ex-post facto. When the integrity verification process on the two documents has successfully verified the integrity of these documents using the same public key, the identity of the signers (persons in possession of Ks upon generation of the signatures) can be certified (on the assumption that the IC card of interest is always owned by the same person).

[Second Embodiment]

Explained below is a second embodiment of the present invention involving the signer's certification information being the secret data memorized by the signer (e.g., password). The system configuration and process flow of this embodiment are the same as those of the first embodiment except for the following specifics:

With the second embodiment, the IC card 130 is not needed. The step for obtaining the signer certification information (S202) and the step for acquiring the candidate certification information (S303) are thus changed as follows:

The certification information input section 103 receives the input of a password from the signer, and generates the pair of a secret key and a public key (Kp,Ks) 131 using the password as the seed (step S202). The method for generating keys from the password may be PBE, for example.

The user certification apparatus 120 receives the input of the password from the candidate, and generates the pair of a secret key and a public key (Kp',Ks') 131 using the password as the seed (step S303).

[Third Embodiment]

Explained below is a third embodiment of the present invention involving the signer's certification information being biometric data (e.g., feature data such as fingerprint, vein pattern, or iris) of the signer. The system configuration and process flow of this embodiment are the same as those of the first embodiment except for the following specifics:

With the third embodiment, the IC card 130 is not needed. The step for obtaining the signer certification information (S202), the step for generating digital data (S203), the step for obtaining candidate certification information (S303), the step for generating and transmitting a response (S304), the step for response verification (S305), and the step for authenticating signer identify (S402) are thus changed as follows:

It should be noted that unlike the password or the like, biometric data may somewhat vary every time it is obtained from the biological body of the same person. Such variations are caused by diverse factors including misalignment, rotation or distortion of the object to be read for obtaining the biometric data; fluctuations in lighting or in other circumstances, and change over the years in the biological body. Thus when two feature data are sufficiently "close" to each other, it is determined that the data have originated from the same biological body (i.e., the same person).

Figure 5:
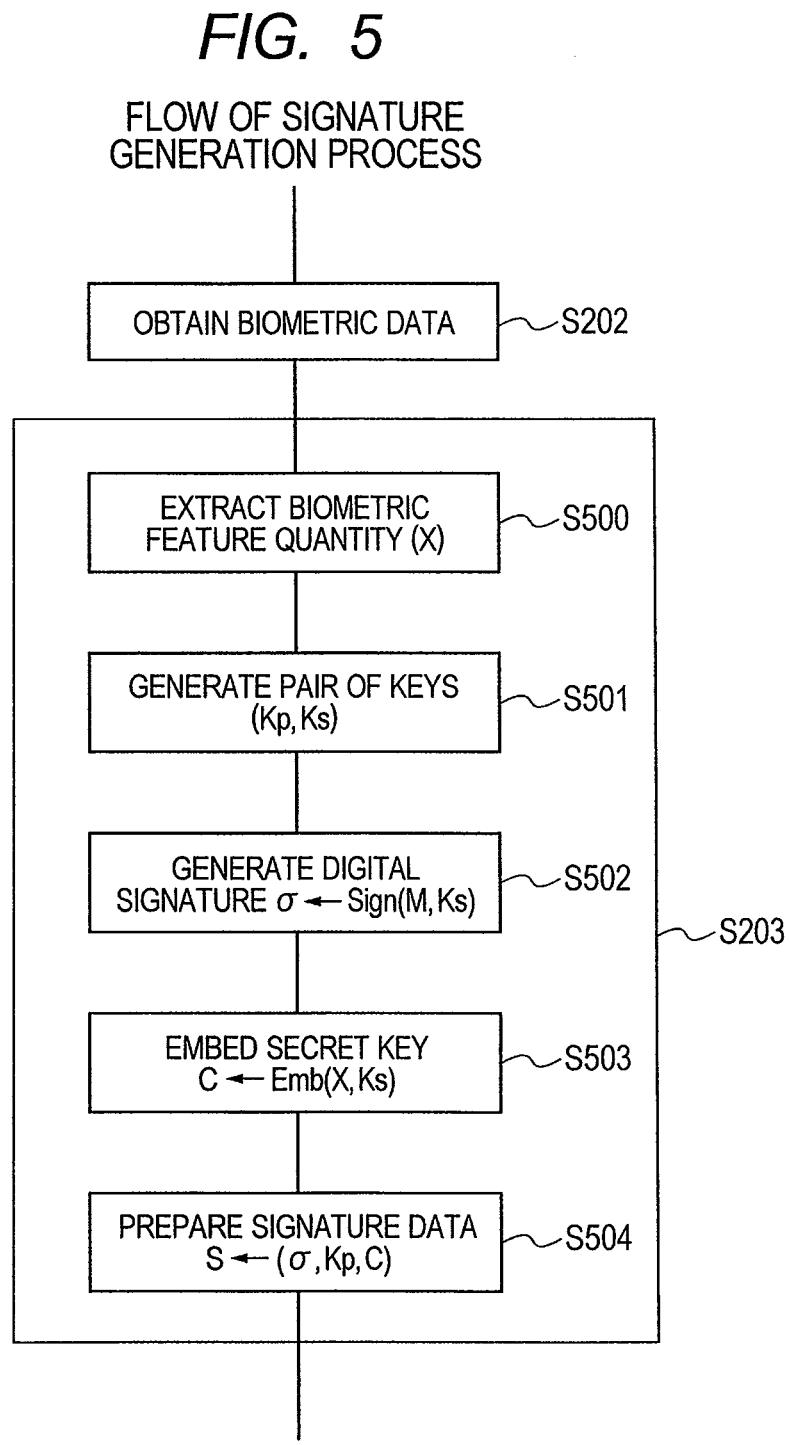
FIG. 5 is a flowchart showing a signature generation process performed by another embodiment of this invention.

What follows is a detailed explanation of steps S202 and S203 with reference to FIG. 5.

The certification information input section 103 obtains the biometric data on the signer (step S202).

The signature data generation section 104 extracts a feature quantity X from the signer's biometric data (step S500).

The signature data generation section 104 randomly generates the pair of a public key and a secret key (Kp,Ks) by means of a suitable digital signature algorithm (e.g., DSA or Schnorr signature) (step S501).

The signature data generation section 104 generates the digital signature σ=Sign(M,Ks) corresponding to the electronic document M using the secret key Ks (step S502).

The signature data generation section 104 embeds the secret key Ks in the feature quantity X using a suitable embedding function Emb so as to prepare a commitment C=Emb(X,Ks) (step S503). In this case, the secret key Ks is embedded in such a manner that the feature quantity X and secret key Ks are sufficiently difficult to estimate on the basis of the commitment C. A specific example of the embedding function Emb will be discussed later.

The signature data generation section 104 generates signature data S=(σ,Kp,C) with the digital signature σ, public key Kp, and commitment C used as a set (step S504).

Figure 6:
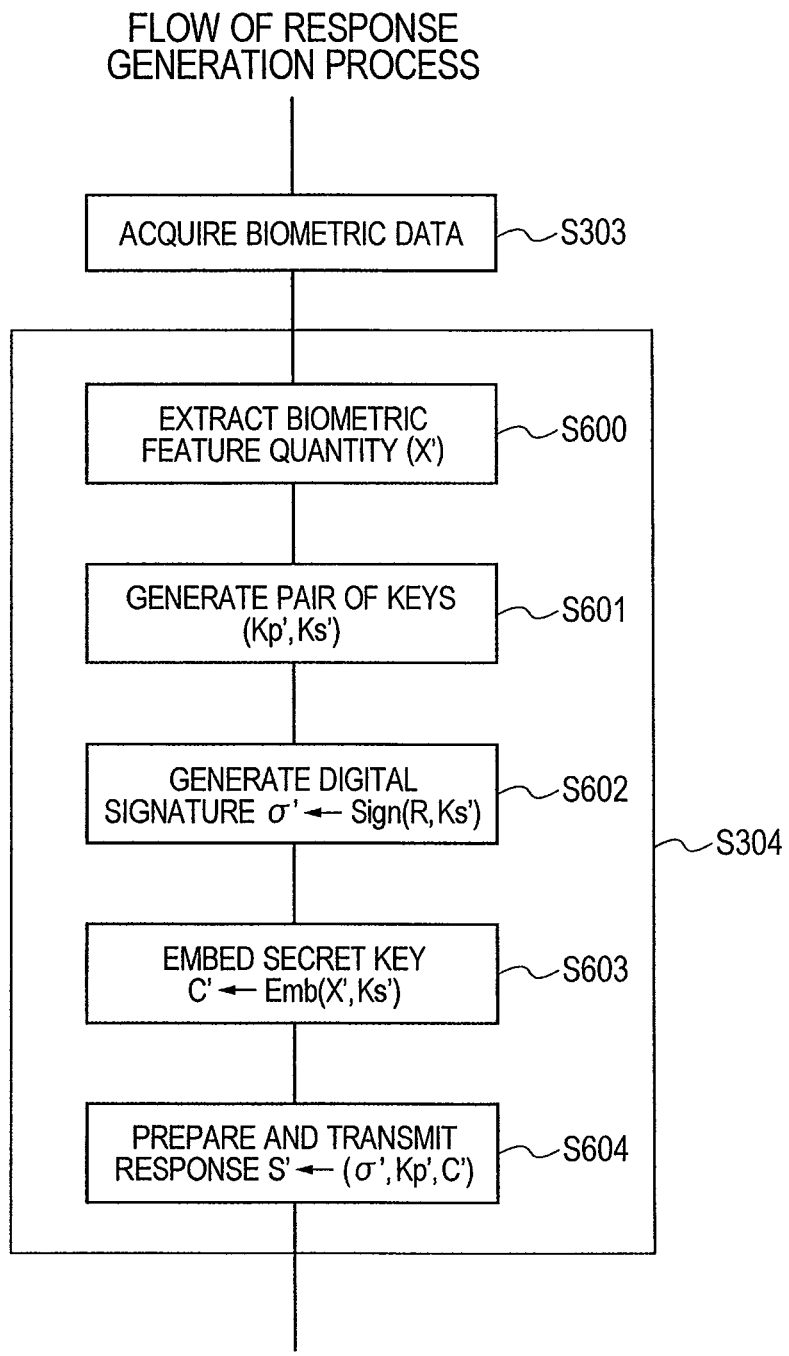
FIG. 6 is a flowchart showing a response generation process performed by the embodiment.

What follows is a detailed explanation of steps S303 and S304 with reference to FIG. 6.

The user certification apparatus 120 reads the biometric data on the candidate (step S303).

From the biometric data on the candidate, the user certification apparatus 120 extracts a feature quantity X' (step S600).

The user certification apparatus 120 randomly generates the pair of a public key and a secret key (Kp',Ks') by means of a suitable digital signature algorithm (e.g., DSA or Schnorr signature)(step S601).

The user certification apparatus 120 generates a digital signature σ'=Sign(R,Ks') corresponding to the challenge code R using the secret key Ks' (step S602).

By means of the suitable embedding function Emb, the user certification apparatus 120 embeds the secret key Ks' in the feature quantity X' so as to prepare a commitment C'=Emb(X',Ks') (step S603).

The user certification apparatus 120 prepares a response S'=(σ',Kp',C') with the digital signature σ', public key Kp', and commitment C' used as a set, and transmits the response to the signature verification apparatus 110 (step S604).

Figure 7:
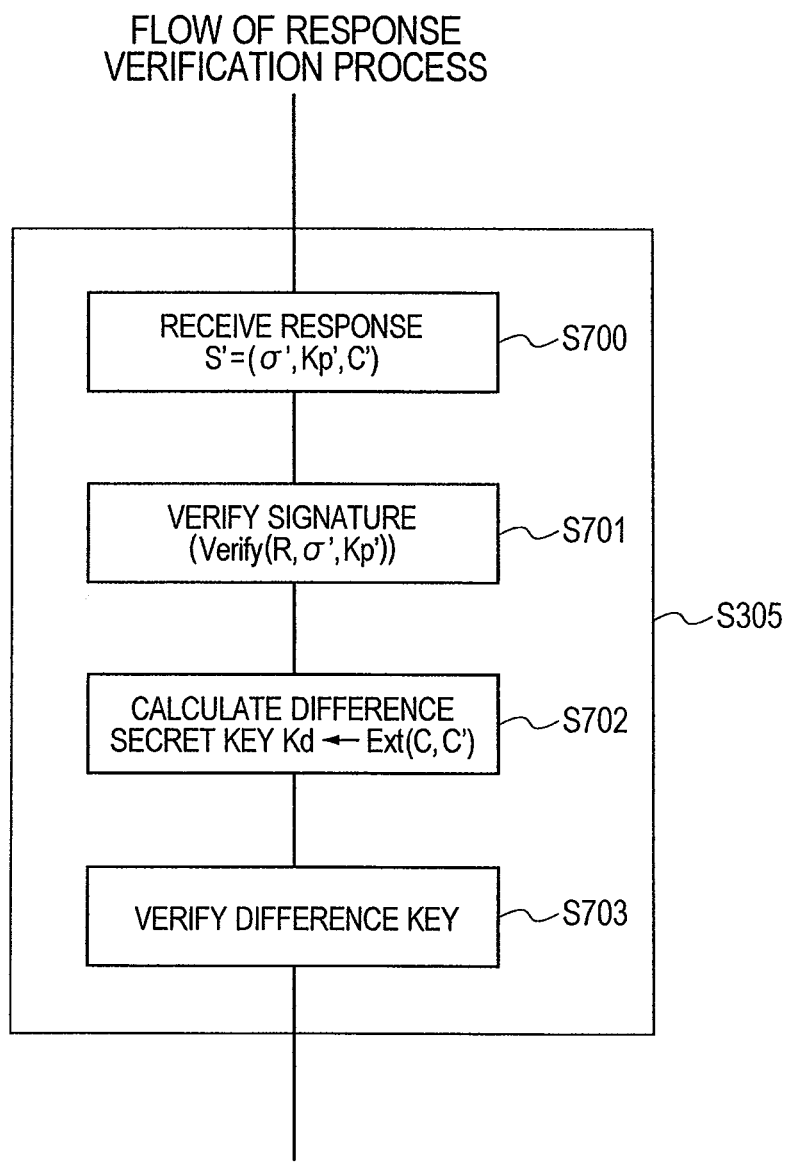
FIG. 7 is a flowchart showing a response verification process performed by the embodiment.

What follows is a detailed explanation of step S305 for response verification with reference to FIG. 7. The steps below are carried out by the identification section 113.

The identification section 113 receives the response S'=(σ',Kp',C') from the user certification apparatus 120 (step S700).

The identification section 113 verifies whether the digital signature σ' is the valid digital signature corresponding to the challenge code R by using the public code Kp' so as to obtain a verification result Verify(R,σ',Kp') (step S701).

Given the commitment C included in the signature data S and the commitment C' included in the response S', the identification section 113 calculates a difference secret key Kd=Ext(C,C') using a suitable function Ext (step S702). In this case, the suitable function Ext is structured in such a manner that if the feature quantity X and the feature quantity X' are sufficiently close (similar) to each other, the difference secret key Kd becomes equal to a calculation result representing the "difference" between the secret key Ks and the secret key Ks' (Kd=Ks−Ks'). A specific example of the function Ext will be discussed later.

The identification section 113 verifies that the difference secret key Kd satisfies the relation Kd=Ks−Ks' using the public key Kp included in the signature data and the public key Kp' included in the response (step S703). A specific verification method will be discussed later. Only when the verification in step S701 and the verification in step S703 are both successful, the result of step S305 for response verification is considered to be "success."

According to this embodiment, if the signer and the candidate are the same person, the feature quantity X and the feature X' are expected to be sufficiently close (similar) to each other. In this case, the difference secret key Kd coincides with the "difference" between the secret key Ks and the secret key Ks' (KSd=KSe−KSs) so that difference key verification is successful (step S703). Conversely, if the user who generated the signature and the registered user are different persons, then the feature quantity X for registration and the feature quantity X' for signature are not expected to be close (similar) to each other. In this case, the difference secret key KSd fails to coincide with the "difference" between the secret key Ks and the secret key Ks' (KD≠Ks−Ks'), so that difference key verification is unsuccessful (step S703).

According to this embodiment, as described above, the integrity of the electronic document is verified by means of the signature σ used in the secret key Ks generated temporarily by the signer and the corresponding public key Kp. At the same time, the signer can be identified ex-post facto using the commitment C in which the secret key Ks is inseparably embedded in the feature quantity X of the signer. It should be noted that in the commitment C, the signature σ and the biometric feature quantity X are coupled with each other via the public key Kp.

Upon identity verification, the candidate generates a signature σ' corresponding to the challenge code, and presents the generated signature to the signature verification apparatus 110 together with the public key Kp' and commitment C'. The signature verification apparatus 110 verifies the signature and ascertains that the commitments C and C' have been prepared from the same biometric feature quantity using the public keys Kp and Kp'. This makes it possible to verify that the candidate is indeed the signer.

Figure 8:
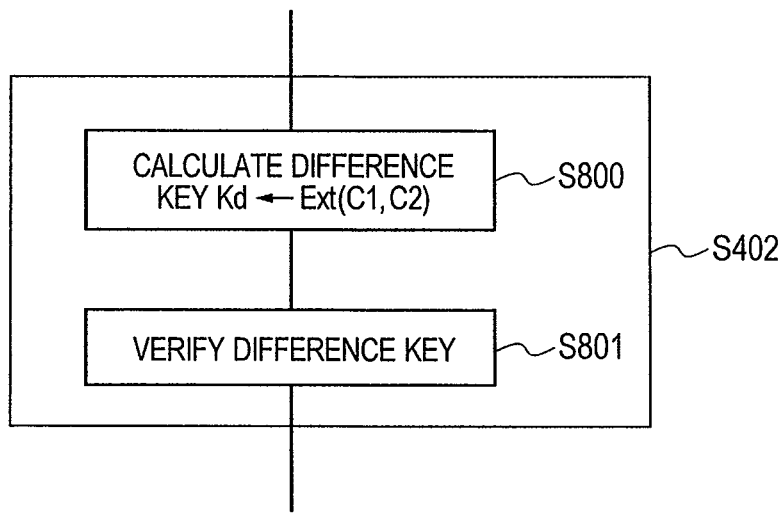
FIG. 8 is a signer identity authentication process performed by the embodiment.

What follows is a detailed explanation of the step for signer identity authentication (step S402) with reference to FIG. 8.

With this embodiment, it should be noted that the signature data S1 and S2 that are input along with the electronic documents M1 and M2 in step S400 take the form of S1=(σ1,C1,Kp1) and S2=(σ1,C2,Kp2), respectively. It is assumed here that the commitment C1 is the data in which the secret key Ks1 corresponding to the public key Kp1 is embedded in the biometric feature quantity X1 of a first signer (C1=Emb(X1,Ks1)) and that the commitment C2 is the data in which the secret key Ks2 corresponding to the public key Kp2 is embedded in the biometric feature quantity X2 of a second signer (C2=Emb(X2,Ks2)).

Given the commitment C1 included in the signature data S1 and the commitment C2 included in the signature data S2, the signer identity authentication section 114 calculates a difference secret key Kd=Ext(C1,C2) using the suitable function Ext (step S800). In this case, it should be noted that if the feature quantity X1 and the feature quantity X2 are sufficiently close (similar) to each other, the difference secret key Kd becomes equal to a calculation result corresponding to the "difference" between the secret key Ks1 and the secret key Ks2 (Kd=Ks1−Ks2).

The signer identity authentication section 114 verifies that the difference secret key Kd satisfies the relation Kd=Ks−Ks2, using the public key Kp1 included in the signature data S1 and the public key Kp2 included in the signature data S2 (step S801). A specific verification method will be discussed later. Only when both the verification in step S800 and the verification in step S801 are successful, the result of step S305 for signer identity authentication is considered to be "success."

With this embodiment, as described above, it is possible to verify ex-post facto that two signatures have been generated by the same person by associating the signature σ1 with the signature σ2, the commitment C1 with the commitment C2, the public key Kp1 with the public key Kp2, and the biometric data X1 with the biometric data X2.

Explained below are specific composition examples of the above-mentioned functions Emb and Ext.

The feature quantity X for registration and the feature quantity X' for signature are defined as follows:

$$X=(x_1, \ldots, x_n), X'=(x'_1, \ldots, x'_n) \tag{1}$$

The two quantities are an n-dimensional real vector each, and there exists between the two a distance L1 defined as follows:

$$d(X,X')=\max_i |x_i - x'_i| \tag{2}$$

If the distance is equal to or less than a predetermined threshold value "t" (d(X,X')≤t), then a match is recognized (stemming from the same biological body). Also, a lattice point set L is defined as follows:

$$L = \langle Y=(y_1, \ldots, y_n) | y_1 \text{ is an integer}, 0 \leq y_1 \leq K \rangle \tag{3}$$

where K is an integer sufficiently larger than "t" or |xi|. Furthermore, a function int that has one integer "z" corresponding to an integer vector Y∈L is defined as follows:

$$z = \text{int}(Y) = \sum_{i=1}^{n} y_i (2K)^{i-1} \tag{4}$$

Also, the inverse function corresponding to the above function (i.e. the function that has the vector Y corresponding to the integer "z") is expressed as follows:

$$Y=\text{int}^{-1}(z) \tag{5}$$

As the digital signature algorithm mentioned above, Schnorr signature may be utilized. How the secret key Ks and public key Kp of Schnorr signature are generated is explained below. First, it is assumed that the secret key Ks is a randomly generated integer and that the public key Kp is given as follows:

$$Kp=g^{Ks} \bmod p \tag{6}$$

where, "p" is a sufficiently large prime number and "g" is the generator of a multiplicative group of an integer residue class ring Zp in which "p" is taken as modulus. The values "p" and "g" are publicly disclosed parameters and are common to all users. Given the above preparations, the embedding function Emb mentioned above is defined as follows:

$$Emb(X,Ks)=X+2t\cdot\text{int}^{-1}(Ks) \tag{7}$$

Also, the above-mentioned function Ext is defined as follows:

$$Ext(C, C') = \text{int}\left(\left[\frac{1}{2t} \cdot (C - C')\right] + 2K \cdot 1\right) \tag{8}$$

where, as opposed to a real vector "v," [v] represents an integer vector obtained by rounding the components (real numbers) of "v" to an integer (mapped to the nearest integer). There also holds:

$$1 = (1, 1, \ldots, 1) \tag{9}$$

$$Ext(C, C') = \text{int}\left(\left[\frac{1}{2t} \cdot (Emb(X, Ks) - Emb(X', Ks'))\right] + 2K \cdot 1\right)$$

representing a vector that has as many as n 1's arrayed therein. In this case, depending on how Ce and Cs are prepared, there holds:

$$= \text{int}\left(\left[\text{int}^{-1}(Ks) - \text{int}^{-1}(Ks') + \frac{1}{2t} \cdot (X - X')\right] + 2K \cdot 1\right) \tag{10}$$

$$= \text{int}\left(\left[\text{int}^{-1}(Ks - Ks') + \frac{1}{2t} \cdot (X - X')\right] + 2K \cdot 1\right)$$

Thus if d(X,X') t, then there holds:

$$Kd=Ext(C,C')=\text{int}(\text{int}^{-1}(Ks-Ks')+2K\cdot 1 = Ks-Ks'+K' \tag{11}$$

where, $$K'=\text{int}(2K\cdot 1) \tag{12}$$

The function Diff mentioned above is defined as follows:

$$Kp|Kp'\cdot g^{K'} \bmod p == g^{Kd} \bmod p \tag{13}$$

Given the above definitions, the difference key verification (steps S703 and S801) need only require verifying whether or not the following equation holds:

$$KPd == g^{KSd} \bmod p \tag{14}$$

As many apparently different embodiments of this invention may be made without departing from the spirit and scope thereof, it is to be understood that the invention is not limited to the specific embodiments thereof except as defined in the appended claims.

What is claimed is:

1. A signature generation and verification system comprising:
    a signature verification apparatus comprising a first central processing unit coupled to each of a first memory unit, a first storage unit, a first input device, and a first output device;
    a user certification apparatus comprising a second central processing unit coupled to each of a second processing unit coupled to each of a second memory unit, a second storage unit, a second input device, and a second output device; and a signature generation apparatus comprising a third central processing unit coupled to each of a third memory unit, a third storage unit, a third input device, and a third output device,
wherein the first central processing unit of the signature verification apparatus is programmed to:
  acquire electronic document data generated by the signature generation apparatus, and signature data made of a set of a digital signature and verification data;
  verify the integrity of the set of the electronic document data and the electronic signature using the verification data;
  transmit to the user certification apparatus via the first output device authentication data for authenticating that the verification data was generated based on predetermined user certification information unique to a user, and identify the user based on the digital signature transmitted from the signature generation apparatus; and
  output an indication of one of an acceptance and a rejection based on at least one of the result of integrity verification and the result of identification,
wherein the second central processing unit of the user certification apparatus is programmed to:
  receive the input of the user certification information; and
  generate the digital signature based on the authentication data received from the signature verification apparatus and transmit the digital signature to the signature verification apparatus via the second output unit,
wherein the third central processing unit of the signature generation apparatus is programmed to:
  receive signer certification information possessed only by a signer;
  generate the digital signature and the verification data, the digital signature and the verification data corresponding to the electronic document data, based on the signer certification information; and
  transmit, as the signature data, the set of the digital signature and the verification data to the signature verification apparatus,
  generate a pair of a secret key and a public key based on the signer certification information, and generate the digital signature corresponding to the electronic document data using the secret key,
  transmit the signature data including the digital signature and the public key to the signature verification apparatus;
wherein the first central processing unit of the signature verification apparatus is further programmed to:
  verify the integrity of the pair of the electronic document data and the digital signature using the public key included in the signature data;
  transmit a challenge code including authentication data to the user certification apparatus,
wherein the second central processing unit of the user certification apparatus is further programmed to:
  transmit a digital signature corresponding to the challenge code to the signature verification apparatus;
wherein the first central processor of the signature verification apparatus is further programmed to:
  receive the digital signature,
  verify the digital signature using the public key, and
  determine that identification is successful if the digital signature is successfully verified;

wherein the second central processing unit of the user certification apparatus is further programmed to:
  generate a secret key based on the user certification information, receive the challenge code,
  generate the digital signature corresponding to the challenge code using the secret key, and
  transmit the digital signature to the signature verification apparatus.

2. A signature generation and verification system comprising:
a signature verification apparatus comprising a first central processing unit coupled to each of a first memory unit, a first storage unit, a first input device, and a first output device; and
a signature generation apparatus comprising a second central processing unit coupled to each of a second memory unit, a second storage unit, a second input device, and a second output device,
wherein the first central processing unit of the signature verification apparatus is programmed to:
receive an input of first electronic document data and first signature data made of a set of a first digital signature and first verification data, and an input of second signature data made of second electronic document data and a set of a second digital signature and second verification data,
verify the integrity of the set of the first electronic document data and the first digital signature using the first verification data, and
verify the integrity of the set of the second electronic document data and the second digital signature using the second verification data;
transmit, to a user certification apparatus, authentication data for authenticating that the first verification data and the second verification data were generated based on signer certification information possessed by the same signer, and
perform the authentication based on the digital signature received from the user certification apparatus without knowledge of the signer certification information; and
output, when both the integrity verification by the integrity verification section and the authentication by the signer identity verification section are successful, an indication of one of an acceptance and a rejection,
wherein the second central processing unit of the signature generation apparatus is programmed to:
receive a signer certification information possessed only by a signer;
generate the digital signature and the verification data, the digital signature and the verification data corresponding to the electronic document data, based on the signer certification information; and
output, via the second output device, the set of the digital signature and the verification data as the signature data;
generate a pair of a secret key and a public key based on the signer certification information, and
generate one of the first digital signature corresponding to the first electronic document data and the second digital signature corresponding to the second electronic document data using the secret key;
output one of the first signature data including the first digital signature and the first public key and the second signature data including the second digital signature and the second public key to the signature verification apparatus;
wherein the first central processor of the signature verification apparatus is further programmed to:

verify the integrity of the set of the first electronic document data and the first digital signature using the first public key included in the first signature data, verify the integrity of the set of the second electronic document data and the second digital signature using the second public key included in the second signature data; and determine whether the first public key and the second public key are the same.

3. The signature generation and verification system according to claim 1, wherein the signer certification information is secret information known only to the signer, and wherein the user certification information is secret information known only to the user.

4. The signature generation and verification system according to claim 1, wherein the signer certification information is biometric data acquired from the biological body of the signer; and wherein the user certification information is biometric data acquired from the biological body of the user.

\* \* \* \* \*